Figure 4:
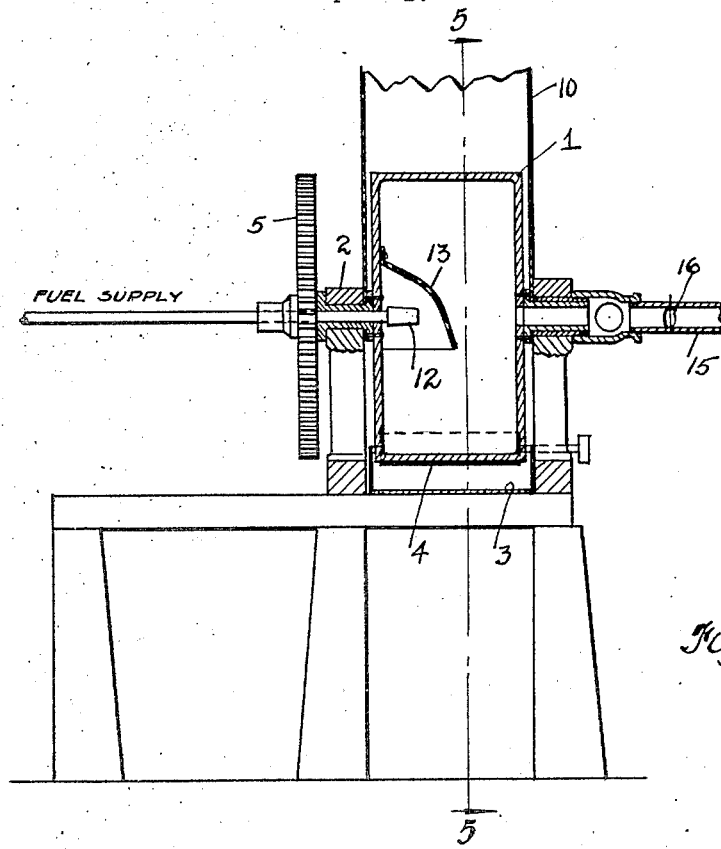

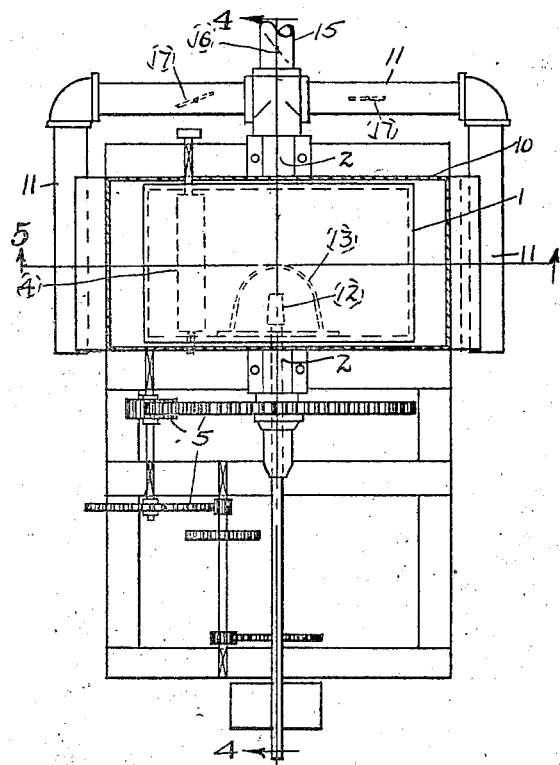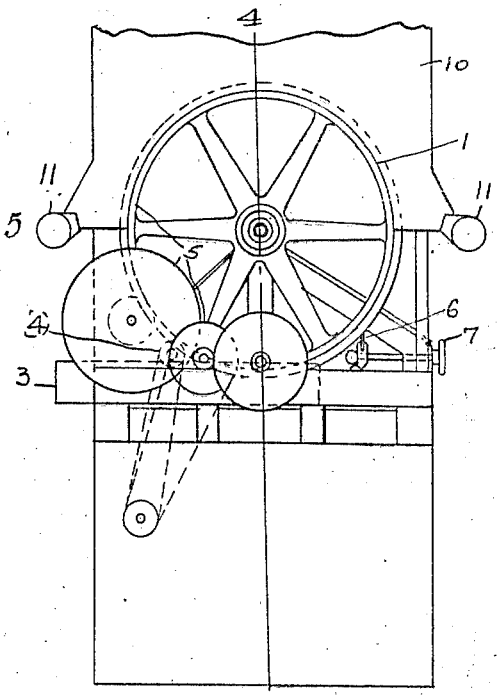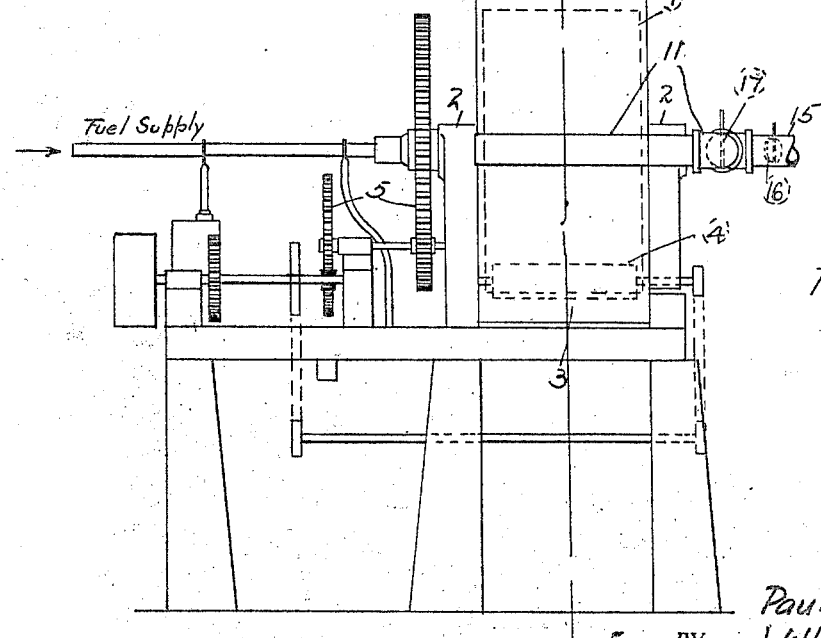

INVENTORS
Paul Cottringer and
BY William R. Collings
Fay, Oberlin & Fay
ATTORNEYS.

Patented Dec. 29, 1925.

1,567,317

UNITED STATES PATENT OFFICE.

PAUL COTTRINGER AND WILLIAM R. COLLINGS, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING ANHYDROUS MAGNESIUM CHLORIDES.

Application filed April 1, 1921. Serial No. 457,611.

*To all whom it may concern:*

Be it known that we, PAUL COTTRINGER and WILLIAM R. COLLINGS, citizens of the United States, and residents of Midland, county of Midland, and State of Michigan, have invented a new and useful Improvement in Methods of Making Anhydrous Magnesium Chlorides, of which the following is a specification, the principle of the invention being herein explained and the best mode in which we have contemplated applying that principle, so as to distinguish it from other inventions.

So far as we are aware, in all methods heretofore proposed for the dehydration of magnesium chloride, such dehydration has been effected by passing either a current of air or equivalent gases at the proper temperature over the hydrated salt, or else by simultaneously passing over such salt a current of dry hydrochloric acid gas. It has not been found possible to completely dehydrate the salt in the presence of air alone, and an atmosphere of hydrochloric acid gas has necessarily been employed, at least in all commercial processes, for effecting the final dehydration. To employ such gas, however, for the whole operation is obviously not feasible because of the quantity of dilute hydrochloric acid that would result, and the process most generally favored accordingly has been one wherein the double magnesium-ammonium salt is formed by adding ammonium chloride to a solution of magnesium chloride, then evaporating to dryness, carefully heating and finally igniting.

The difficulty with heating the normal hexa-hydrate ($MgCl_2.6H_2O$) either directly or by passing a current of heated air thereover, is that such hydrate will melt and form a solution in its water of crystallization at a relatively low temperature and dehydration of the resulting solution must be carried on at a very slight increase of temperature and with extreme caution if decomposition of the salt is to be avoided.

The object of the present invention is to provide an improved method and apparatus for use therein whereby the partial dehydration of the salt in question (down to the stage where final dehydration by means of a stream of hydrochloric acid gas may be economically employed) may be accomplished without encountering the difficulty just noted. At the same time such dehydration, for example to the dihydrate form, is quickly and economically effected, the apparatus requiring a relatively small amount of floor space and a minimum of oversight and attention while in operation.

To the accomplishment of the foregoing and related ends the invention then consists of the steps and means hereinafter fully described and particularly pointed out in the claims, the annexed drawing and the following description setting forth in detail one mode of carrying out the invention, such disclosed mode constituting, however, but one of various ways in which the principle of the invention may be used.

In said annexed drawing:—

Figure 5:
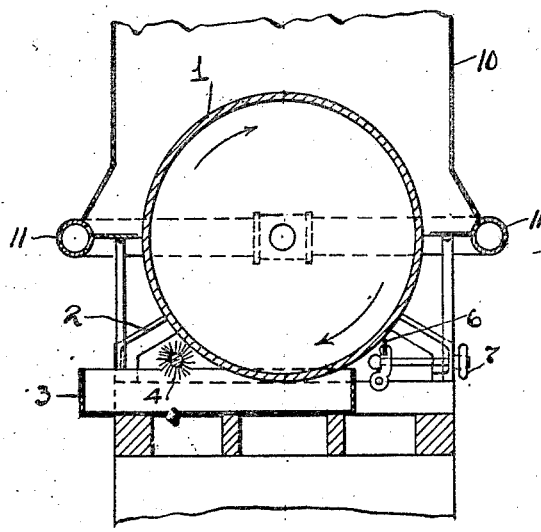

Fig. 1 is a plan view of one form of apparatus adapted for carrying out our present improved method or process; Fig. 2 is an end elevation of the same; Fig. 3 is a side elevation thereof; and Figs. 4 and 5 are vertical sections taken on the planes indicated by the lines 4—4 and 5—5 on Figs. 1, 2 and 3.

Briefly stated, the present improved process consists in drying to the stage indicated a solution of the normal hexa-hydrate salt on the surface of a rotary drum dryer, such solution consisting either of the salt in question dissolved in its own water of crystallization, or with a slight excess of water, it being unnecessary for use in the process in hand that the salt be first crystallized out as in prevailing methods.

Referring to the several figures of the drawing, the drum 1 is provided with trunnions journaled in suitable bearings 2, said drum being closed save for inlet and outlet openings through such trunnions respectively. Located below the drum is a suitable receptacle 3 into which the lowermost portion of the surface of the drum dips, a suitable quantity of the aforesaid solution of normal hydrate being maintained in said receptacle so as to keep the level thereof substantially constant. The drum as shown will contact with the solution in the receptacle, and in addition, or without such contact, a rotary brush 4 may be provided which dips into the solution and also contacts with the surface of the drum, thus insuring the adherence of a film of such solution to the surface of the drum as the latter rotates in the direction indicated by the arrow. Rotation of the drum and of the brush is provided for by means of suitable driving mechanism consisting of a train of gears 5 which does not need to be described in detail.

On the opposite side of the drum from receptacle 3 there is located an adjustable scraper 6 that may be pressed into more or less close contact with the surface of the drum by means of handwheel 7, as will be readily understood, and serves to scrape off the film in question which in the meantime will have become a thin, dry layer of the partially dehydrated salt, as will be presently explained. A chute or suitable receptacle (not shown) will of course be provided to receive the material as it is thus scraped off and discharged into the same, clear of the apparatus.

Laterally surrounding the drum on all sides is a housing 10, the upper portion of which is shown broken away in Fig. 2, but which it will be understood is connected with a suitable flue or other exit for gases. The one hollow trunnion of the drum, as best shown in Fig. 1, is connected with said housing 10 by means of a branched duct 11, the respective branches of which are bent to lie parallel with the axis of the drum and are longitudinally slit so as to communicate with the housing on the respective sides of said drum and on a horizontal plane passing through the latter's axis (see Fig. 2). Extending into the other hollow trunnion of the drum is an oil or gas burner 12, the gases of combustion from which are discharged directly into the interior of the drum, their uniform distribution being effected by means of a hood or baffle 13, disposed to initially direct such gases in a downward direction. The temperature of the surface of the drum is maintained by the foregoing means at from between 250 degrees to 350 degrees centigrade, and after passing through the drum, the gases of combustion, it will be observed, may be returned by means of the branched duct 11 to the housing 10, where they pass over the drum and in direct contact with the film of material thereon before finally escaping. In this way the process is helped out not only because some of the moisture is carried off with the gases but heat losses due to radiation from the drum are at the same time cut down, the products of combustion, together with the water vapor and any slight amount of hydrochloric acid gas that is set free, passing up the stack together.

By keeping the temperature of the drum surface within the range indicated and by properly regulating its rate of rotation so that the film of chloride that adheres to such surface is in contact therewith for approximately one minute, we have found it possible to completely dry the normal hydrate ($MgCl_2.6H_2O$) to the dihydrate form ($MgCl_2.2H_2O$). There will be a slightly greater loss by decomposition of magnesium chloride to the oxide with corresponding setting free of hydrochloric acid than where the drying is carried on by bringing heated air only into contact with the chloride, but the method has not only the advantage of much higher rate of drying but the normal chloride which forms the starting material does not have to be crystallized or flaked preliminary to such drying operation. Moreover a minium of floor space is required by the apparatus because of its compact design and the fuel consumption should not be any greater, if as great as in a process where heated air alone is relied on to effect dehydration.

It will be understood of course that instead of either the fused hexa-hydrate or a solution thereof forming the starting material, any lower hydrate that will stay molten at the elevated temperature to which it is subjected due to contact of the drum with the material in receptacle 3, may be used. The product from the apparatus which will consist in the main, as just stated, of the dihydrate, where the temperature and other controlling factors are properly determined, may then be completely dehydrated in the usual way by employing a current of hydrochloric acid gas in a suitable apparatus.

As best shown in Fig. 1, the branched duct 11 is also provided with a straight extension 15 controlled by a suitable valve or damper 16; also a similar valve or damper 17 is placed in each of the branches of said duct 11. By virtue of this arrangement, the gases of combustion may, if desired, be confined wholly to the interior of the drum 1, being discharged directly therefrom through such extension 15; or such gases may be returned in whole or part through such branches of duct 11. The valves or dampers 17 in such branches, moreover, may be adjusted in different open positions to vary the heating effect of the gases as applied to the respective portion of the drum's cylindrical surface lying on opposite sides of a vertical plane passing through the axis of the drum. The heating intensity of the two currents of gases thus passed over such respective film portions is of course a function not merely of the temperature of the gases, which will be approximately the same at least initially in the case of both currents, but also of the rate of flow and volume of the two currents. In other words, by reducing the rate of flow or volume of the current on one side below that on the other side, a corresponding difference in rate of drying and in effective heat application to the film is obtainable.

Other modes of applying the principle of our invention may be employed instead of the one explained, change being made as regards the steps herein disclosed, provided those stated by any of the following claims or their equivalents be employed.

We therefore particularly point out and distinctly claim as our invention:—

1. In a method of treating liquefiable chemical compounds, the steps which consist in bringing successive portions of the exterior cylindrical surface of an interiorly heated rotary drum into contact with a liquid body of such a compound, whereby a film of the latter is caused to adhere to such surface, simultaneously passing currents of gases of combustion having different degrees of heating intensity over the portions of such film lying on opposite sides of a vertical plane passing through the axis of such drum, and then removing such film.

2. In a method of removing water from chemical compounds, the steps which consist in bringing successive portions of the exterior cylindrical surface of an interiorly heated rotary drum into contact with a liquid body of such a compound, whereby a film of the latter is caused to adhere to such surface, simultaneously passing currents of gases of combustion having different degrees of heating intensity over the portions of such film lying on opposite sides of a vertical plane passing through the axis of such drum, and then removing such film.

3. In a method of removing water of crystallization from a hydrated form of magnesium chloride, the steps which consist in bringing successive portions of the exterior cylindrical surface of an interiorly heated rotary drum into contact with a liquid body of such chloride, whereby a film of the latter is caused to adhere to such surface, simultaneously passing currents of gases of combustion having different degrees of heating intensity over the portions of such film lying on opposite sides of a vertical plane passing through the axis of such drum, the hotter gases being passed over the film portion that has traveled farthest from the point where the drum contacts with such liquid body, and then removing such film after such chloride has been suitably dehydrated.

4. In a method of removing water of crystallization from a hydrated form of magnesium chloride, the steps which consist in bringing successive portions of the exterior cylindrical surface of a rotary drum into contact with a liquid body of said chloride, whereby a film of the latter is caused to adhere to such surface, applying heated gases of combustion interiorly to said drum, simultaneously returning such gases of combustion after passing through the drum to contact with such cylindrical surface of said drum on opposite sides of a vertical plane passing through the axis thereof, the return of such gases being regulated so that the hotter gases are passed over the portion of such drum-surface that has traveled farthest from the point where such surface contacts with such liquid body, and then removing such film after said chloride has been suitably dehydrated.

Signed by us, this 25th day of March, 1921.

PAUL COTTRINGER.
WILLIAM R. COLLINGS.